(12) United States Patent
Li et al.

(10) Patent No.: US 10,744,711 B2
(45) Date of Patent: Aug. 18, 2020

(54) SURFACE FEATURE ARRAYS FOR ADDITIVELY MANUFACTURED PRODUCTS

(71) Applicant: Carbon, Inc., Redwood City, CA (US)

(72) Inventors: Yongqiang Li, Sunnyvale, CA (US); Shawn Fortner, Redwood City, CA (US); Hardik Kabaria, San Francisco, CA (US)

(73) Assignee: CARBON, INC., Redwood City, CA (US)

( * ) Notice: Subject to any disclaimer, the term of this patent is extended or adjusted under 35 U.S.C. 154(b) by 0 days.

(21) Appl. No.: 16/007,368

(22) Filed: Jun. 13, 2018

(65) Prior Publication Data

US 2019/0009458 A1    Jan. 10, 2019

Related U.S. Application Data

(60) Provisional application No. 62/530,599, filed on Jul. 10, 2017.

(51) Int. Cl.
| | |
|---|---|
| B29C 64/00 | (2017.01) |
| B29C 64/124 | (2017.01) |
| B29C 64/35 | (2017.01) |
| B29C 64/153 | (2017.01) |
| B33Y 80/00 | (2015.01) |
| B32B 3/08 | (2006.01) |
| B33Y 40/00 | (2020.01) |
| B33Y 10/00 | (2015.01) |
| B29C 64/30 | (2017.01) |

(52) U.S. Cl.
CPC .......... *B29C 64/124* (2017.08); *B29C 64/153* (2017.08); *B29C 64/35* (2017.08); *B32B 3/085* (2013.01); *B33Y 80/00* (2014.12); *B29C 64/30* (2017.08); *B33Y 10/00* (2014.12); *B33Y 40/00* (2014.12); *Y10T 428/249953* (2015.04); *Y10T 428/249991* (2015.04)

(58) Field of Classification Search
CPC .................. B32B 3/085; B33Y 10/00; Y10T 428/249991; Y10T 428/249953
USPC ....................................... 428/195.1
See application file for complete search history.

(56) References Cited

U.S. PATENT DOCUMENTS

| | | | | |
|---|---|---|---|---|
| 2012/0324664 | A1* | 12/2012 | Carpenter | A46B 1/00 15/143.1 |
| 2013/0143060 | A1* | 6/2013 | Jacobsen | B29C 71/02 428/594 |
| 2015/0111979 | A1* | 4/2015 | Yang | C08G 75/14 522/15 |
| 2016/0360828 | A1* | 12/2016 | Guyan | A43B 13/186 |
| 2017/0057193 | A1* | 3/2017 | Clough | B32B 3/085 |
| 2018/0010524 | A1* | 1/2018 | Peace | F01D 25/24 |

* cited by examiner

*Primary Examiner* — Betelhem Shewareged
(74) *Attorney, Agent, or Firm* — Myers Bigel, P.A.

(57) ABSTRACT

A polymer object includes (a) a body portion having a surface portion thereon; (b) at least a first array of feature elements formed on said surface portion, each of said feature elements comprising: (i) a support structure connected to said surface portion and extending upward therefrom; and (ii) a top segment connected to said support structure, said top structure and said support structure together defining an internal cavity formed therein; (c) said polymer object produced as a single piece object by an additive manufacturing process.

13 Claims, 4 Drawing Sheets

SURFACE FEATURE ARRAYS FOR ADDITIVELY MANUFACTURED PRODUCTS

RELATED APPLICATIONS

This applications claims priority to U.S. Provisional Application Ser. No. 62/530,599, filed Jul. 10, 2017, the disclosure of which is hereby incorporated by reference in its entirety.

FIELD OF THE INVENTION

The present invention concerns articles of manufacture having functional surfaces such as gripping surfaces thereon, and methods of making the same by additive manufacturing.

BACKGROUND

There are a variety of manufactured objects where it is desirable to have different functional characteristics on the surface of the part rather than in the body of the object. For example, a power tool handle may require a substantially rigid body, yet a gripping surface that provides cushioning and/or vibration isolation to the operator.

Such characteristics are traditionally imparted by adhesively attaching two different materials to one another (see, e.g., U.S. Pat. No. 6,974,626) or overmolding a soft material onto another, harder, substrate material (see, e.g., U.S. Pat. No. 7,808,816). Disadvantages of overmolding, however, are that it is a complex process that requires expensive tooling, the expensive tooling makes it difficult to customize, and the resulting products may encounter adhesion problems during extended field use.

Additive manufacturing with different grades of materials offers some promise for these types of applications, but changing materials during additive manufacturing can slow the process, mechanical properties can be limited by the materials available, and again adhesion issues between different materials may be encountered during extended field use.

Accordingly, there is a need for new ways to manufacture three-dimensional objects as a single, unitary, piece of material, which objects have surface regions with functional characteristics that differ from other portions of the object.

SUMMARY

In some embodiments, a polymer object includes (a) a body portion having a surface portion thereon; (b) at least a first array of feature elements formed on said surface portion, each of said feature elements comprising: (i) a support structure connected to said surface portion and extending upward therefrom; and (ii) a top segment connected to said support structure, said top structure and said support structure together defining an internal cavity formed therein; (c) said polymer object produced as a single piece object by an additive manufacturing process.

In some embodiments, the polymer object is a single unitary member (one-piece construction without seams or other connections). The polymer object may be formed of a single material.

In some embodiments, the feature elements are configured to deform or collapse by bending and/or buckling upon application of pressure thereto (e.g., constant pressure such as by grasping, vibratory pressure, etc.) and return to their previous configuration upon removal of such pressure.

In some embodiments, the support structure comprises a circumferential wall or a plurality of arms (e.g., 2, 3, 4, 5, 6, 7 or 8 arms).

In some embodiments, (i) all of said feature elements in said array have the same external configuration, and optionally wherein at least some of said feature elements in said array have internal dimensions (e.g., arm thickness) that differ from that of other feature elements in said array (e.g., to provide variable stiffness or elasticity in different regions of the array); or (ii) said array comprises a first set of feature elements and a second set of feature elements interspersed with one another, the feature elements of said first set having a height greater than the feature elements of said second set.

In some embodiments, at least some of said feature elements further comprise at least one support post positioned within said support structure, each said support post interconnecting said surface portion and said top segment.

In some embodiments, the top segment is flat, convexely curved, concavely curved, or a combination thereof.

In some embodiments, the array comprises a dispersed array, a nested array (e.g., to produce progressively increasing stiffness as the surface is compressed), or a combination thereof.

In some embodiments, the object surface portion on which said array is formed comprises a flat region, a concavely curved region, a convexly curved region, or a combination thereof.

In some embodiments, at least one of said top segment and said support structure has at least one orifice formed therein (e.g., wherein said feature element comprises a perforated dome).

In some embodiments, each feature element has a height of from 1 or 2 millimeters to 10 or 20 millimeters, or more; each feature element has a maximum width of from 1 or 2 millimeters to 10, 20 or 40 millimeters, or more; and/or said feature elements are included in said surface array at a density of from 1, 2, 10 or 20 per square centimeter of, to 100, 200, or 300 per square centimeter, or more.

In some embodiments, the additive manufacturing comprises stereolithography, including both top-down and bottom-up stereolithography such as continuous liquid interface production (e.g., from a single batch of polymerizable resin) or selective laser sintering (e.g., from a single batch of sinterable polymer particulate).

In some embodiments, the resin comprises a dual cure resin (e.g., a flexible or elastomeric polyurethane dual cure resin).

In some embodiments, the object comprises a hand grip or hand grip wrap, and said surface portion comprises a gripping region of said grip or grip wrap.

In some embodiments, a method of making an object as described above includes (a) forming said object by an additive manufacturing process; (b) optionally washing said object; and (c) optionally further curing said object (e.g., by baking).

In some embodiments, the additive manufacturing process comprises selective laser sintering or stereolithography.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

Figure 1A:
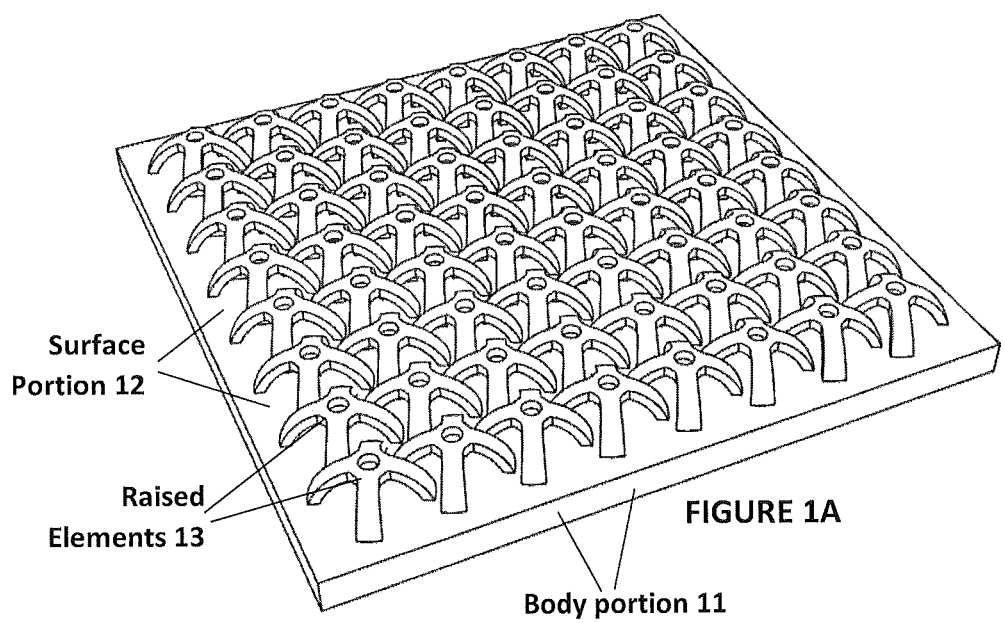
FIG. 1A is a perspective view of a first embodiment of an array of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

1. Methods of Making.

Objects or constructs as described herein can be produced by any suitable process, but are preferably produced by additive manufacturing, particularly by selective laser sintering (SLS) of stereolithography, and in some embodiments by continuous liquid interface production (CLIP).

Techniques for additive manufacturing are known. Suitable techniques include bottom-up or top-down additive manufacturing, generally known as stereolithography Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce, and US Patent Application Publication No. 2013/0295212 to Chen et al. The disclosures of these patents and applications are incorporated by reference herein in their entirety.

CLIP is known and described in, for example, U.S. Pat. Nos. 9,211,678; 9,205,601; and 9,216,546; and also in J. Tumbleston, D. Shirvanyants, N. Ermoshkin et al., Continuous liquid interface production of 3D Objects, *Science* 347, 1349-1352 (published online 16 Mar. 2015). See also R. Janusziewcz et al., Layerless fabrication with continuous liquid interface production, *Proc. Natl. Acad. Sci. USA* 113, 11703-11708 (Oct. 18, 2016). In some embodiments, CLIP employs features of a bottom-up three dimensional fabrication as described above, but the the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

In one non-limiting embodiment, the object may be produced on a Carbon Inc., M1 additive manufacturing apparatus, available from Carbon, Inc., 1089 Mills Way, Redwood City, Calif. 94063 USA.

After the intermediate three-dimensional object is formed, it is optionally washed, optionally dried (e.g., air dried) and/or rinsed (in any sequence). It is then further cured, preferably by heating.

Heating may be active heating (e.g., in an oven, such as an electric, gas, solar oven or microwave oven, or combination thereof), or passive heating (e.g., at ambient temperature). Active heating will generally be more rapid than passive heating and in some embodiments is preferred, but passive heating—such as simply maintaining the intermediate at ambient temperature for a sufficient time to effect further cure—may in some embodiments also be employed.

2. Materials.

Any suitable material can be used as the polymerizable liquid or resin to carry out the present invention (including expansion lattices, compression lattices, and clamping apparatus comprising the two integrally formed with one another). Preferably, the material is one which produces an elastomeric product. In some embodiments, the objects are comprised of a polyurethane material (including polyurea materials). In some embodiments, the objects are produced from a dual cure stereolithography resin.

Dual cure stereolithography resins suitable for stereolithography techniques (particularly for CLIP) are described in J. Rolland et al., U.S. Pat. Nos. 9,453,142 and 9,598,606 (see also US Patent Application Pub. Nos. US 2016/0136889; 2016/0137838; and 2016/016077). These resins usually include a first polymerizable system typically polymerized by light (sometimes referred to as "Part A") from which an intermediate object is produced, and also include at least a second polymerizable system ("Part B") which is usually cured after the intermediate object is first formed, and which impart desirable structural and/or tensile properties to the final object.

In some embodiments, the polymerizable liquid is a Carbon, Inc. elastic polyurethane (EPU) resin such as EPU40, or a flexible polyurethane (FPU) resin, such as FPU50, available from Carbon, Inc., 1089 Mills Way, Redwood City, Calif. 94063 USA. For SLS, examples of suitable materials include PrimePart® ST (PEBA 2301), available from EOS Manufacturing Solutions, and Duraform TPU and Duraform FLEX, available from 3D Systems.

Objects.

In brief overview, numerous small three-dimensional structures (domes, arches, lattices, etc.) are formed on the surface of an object during additive manufacturing thereof. When a force is applied on the object surface, the small structures deform by bending and/or buckling. The bending or buckling stiffness of the small structures can be tuned to be less than, and in some cases substantially less than, the tensile or compressive stiffness of the entire object as a whole. The geometries (thickness, span, configuration, etc.) of the small structures, and the manner in which the structures are arranged throughout the object surface, can be varied to achieve a wide range of topical stiffness or tactile characteristics not achievable with a solid surface continuum. When desired, by building variable structures in different surface portions of the same object, the topical stiffness of the object can vary from area to area.

In some embodiments, the object is formed as a single piece object, such as a single unitary member (one-piece construction without seams or other connections).

EXAMPLES

An array of small three-dimensional structures on the surface of a larger object is shown in FIGS. 1A, 1B, 1C, and 1E. In general, the object includes a body portion 11 having a surface portion 12 thereon, with a two-dimensional array of surface features, or raised elements 13, formed on the surface portion.

Each element 13 is in turn comprised of a supporting structure (in the case of FIGS. 1A-1F, a plurality of arms 21) which support a top segment 22, with the supporting structure and the top segment defining with the underling surface portion 12 an inner cavity 24, into which the top segment can be depressed by the application of pressure thereto, and the corresponding bending or buckling of the support structure (e.g., arms) and/or the top segment.

While the surface portion 12 is shown as uniformly flat throughout and beneath the array, it will be appreciated that the surface portion beneath each raised element may be either elevated, for example as a convex surface region beneath a raised element (e.g., to reduce the amount by which an element can be depressed), or depressed, for example as a concave surface region beneath a raised element (e.g., to increase the amount by which a raised element can be depressed). For example, in some embodiments, the surface portion beneath the raised elements can be configured so that when the raised elements are depressed, the top portions thereof become substantially co-planar with the surface portion 12, presenting or creating a substantially smooth overall configuration on the surface portion.

The (optional, but in some embodiments preferable) orifice 25 included in the top segment 22 serves to provide additional edges to enhance grip, and to provide additional channels for enhanced air-flow and breathability (see "Applications" below).

Progressive, Nested, and Composite Arrays.

As previously noted, the feature elements of an array may be the same as one another, or may differ from one another, in shape, internal geometry, and/or size. For example, as shown in FIG. 1D, higher feature elements 13 and lower feature elements 13' may be interspersed with one another (both extending in two dimensions) to provide a more progressively increasing resistance to deformation as pressure (e.g., gripping force) is applied, with the higher elements 13 providing the initial cushioning, and the lower elements 13' providing additional resistance as increasing force is applied (e.g., to allow for air flow or ventilation). Progressive arrays may be nested or dispersed, and/or implemented as a composite with other arrays, as discussed below.

Figure 1B:
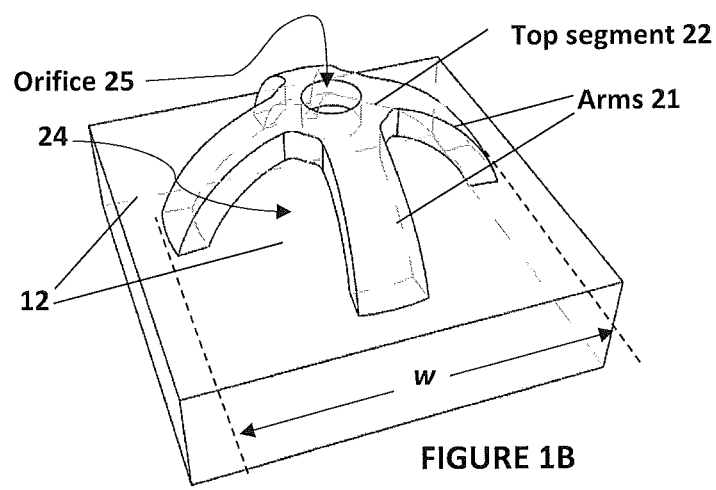
FIG. 1B is perspective, detailed, view of one feature or element of the array of FIG. 1A.
Figure 1C:
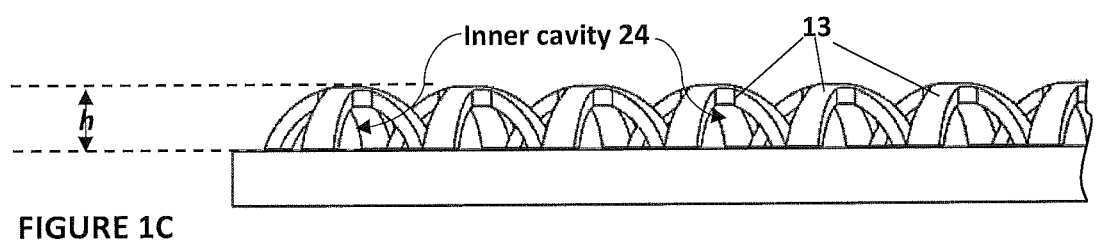
FIG. 1C is a side view of the array of FIGS. 1A-1B.
Figure 1D:
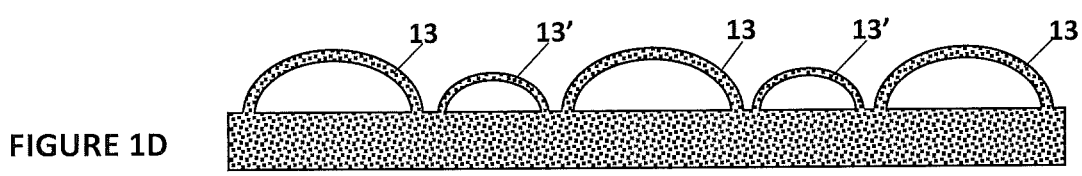
FIG. 1D is a side view of an array similar to that shown in FIG. 1C, now with an additional, second, lower height array interspersed within the first array.
Figure 1E:
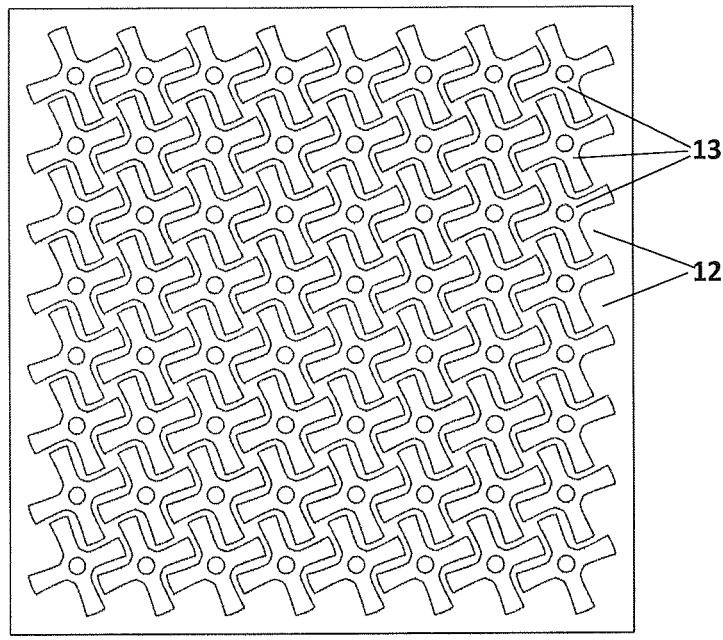
FIG. 1E is a top plan view of an array of FIG. 1A-1C.
Figure 1F:
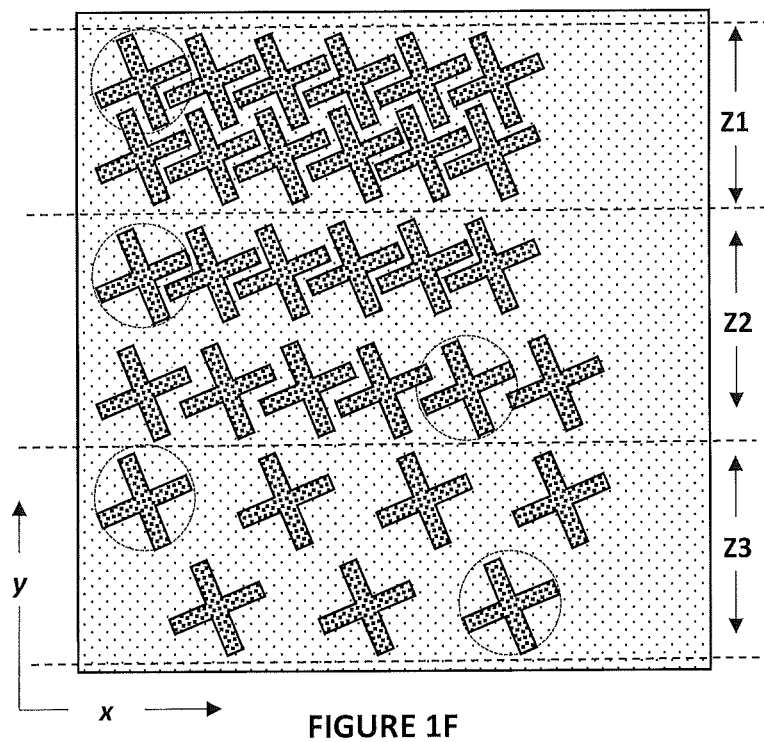
FIG. 1F is a top plan view of an array similar to that of FIGS. 1A-1D, except that, instead of all of the individual feature elements being nested in two dimensions (x, y), the elements are nested in two dimensions in zone 1 (Z1), then nested in a single dimension in zone 2 (Z2), and then dispersed in zone 3 (Z3).

Arrays may be nested in one or two dimensions, or dispersed, as shown in FIG. 1F. An array is "nested" in two dimensions when portions of feature elements therein intrude into the outer circumference of an adjacent feature element in both the x and y direction, as shown in zone 1 (Z1) of FIG. 1F (where dashed circles represent the outer circumference of individual feature elements). An array is nested in one dimension when portions of feature elements therein intrude into the outer circumference of an adjacent feature element in only one of either the x or y direction, as shown in zone 2 (Z2) of FIG. 1F. An array is dispersed when portions of feature elements therein do not intrude into the outer circumference of adjacent feature elements in either the x or y direction, as shown in zone 3 (Z3) of FIG. 1F. In any single object or product having at least one array as described herein on a surface portion thereof, multiple configurations of nesting or dispersing may be used, and may merge into one another to form a composite array (e.g., to achieve "feathering" of the array), as shown in FIG. 1F. Also, while all the feature elements in the composite array of FIG. 1F are all of the same geometry, composite arrays may be formed by changing the geometry of individual feature elements, gradually or suddenly, in different portions of the composite array.

Additional non-limiting examples of surface structures that can be included in arrays as described herein are shown in FIGS. 2A-2B, 3A-3B, 4A-4B, 5A-5B, and 6A-6B, which are side sectional and top plan views, respectively, of five alternate versions of surface structures that can be arranged in a regular, optionally nested, array or irregular, optionally dispersed, array on the surface of an additively manufactured object. Analogous features or elements in different figures are assigned like numbers herein.

Figure 2A:
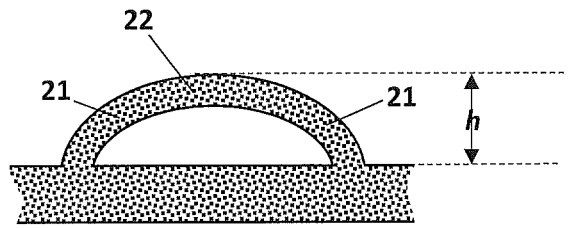
FIG. 2A is a side sectional view of a second embodiment of an individual feature element useful for making an array of the present invention.
Figure 2B:
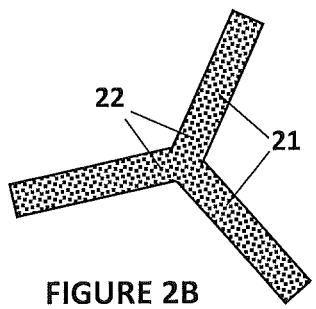
FIG. 2B is a top plan view of the feature element of FIG. 2A.

FIGS. 2A-2B shows a feature element similar to that shown in FIGS. 1A-1C, except without a top orifice, and with a three-arm rather than four-arm configuration.

Figure 3A:
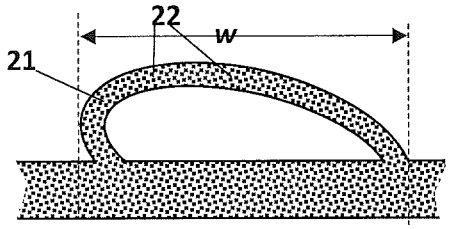
FIG. 3A is a side sectional view of a third embodiment of a feature element useful for making an array of the present invention.
Figure 3B:
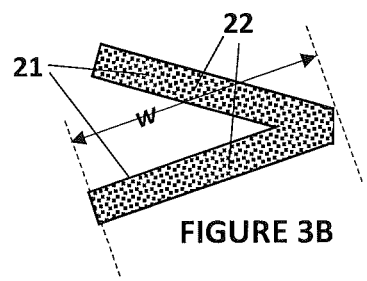
FIG. 3B is a top plan view of the feature element of FIG. 3A.

FIGS. 3A-3B show an asymmetric (for a directional grip), two-arm, configuration for a feature element, as may be suitable for a directional gripping surface.

Figure 4A:
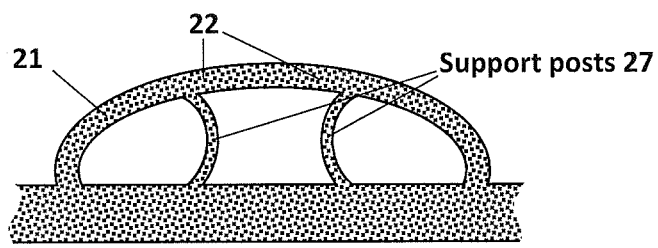
FIG. 4A is a side sectional view of a fourth embodiment of a feature element useful for making an array of the present invention.
Figure 4B:
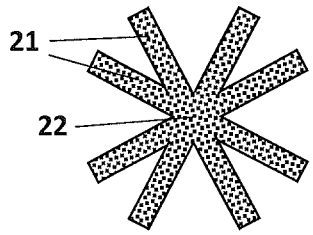
FIG. 4B is a top plan view of the feature element of FIG. 4A.

FIGS. 4A-4B show a symmetric, eight-arm, configuration for a feature element, with underlying bendable support arms, as may be used to provide greater resistance to deformation on a surface.

Figure 5A:
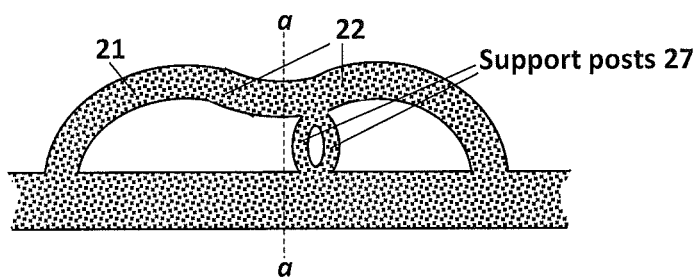
FIG. 5A is a side sectional view of a fifth embodiment of a feature element useful for making an array of the present invention.
Figure 5B:
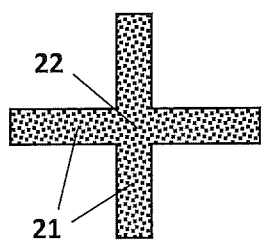
FIG. 5B is a top plan view of the feature element of FIG. 5A.

FIGS. 5A-5B show a feature element with a concavity formed in the top bridging region, an offset or asymmetric underlying bendable support arms (e.g., for a directional grip), and a four-arm configuration.

Figure 6A:
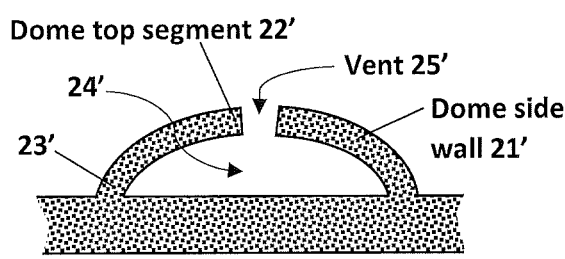
FIG. 6A is a side sectional view of a sixth embodiment of one feature element useful for making an array of the present invention.
Figure 6B:
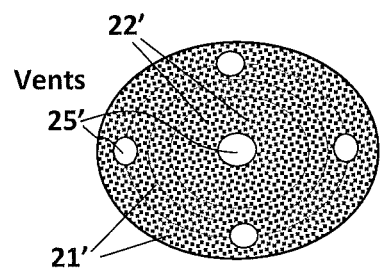
FIG. 6B is a top plan view of the feature element of FIG. 6A.

FIGS. 6A-6B show a feature element having a domed configuration, with a plurality of vent openings formed therein to permit otherwise entrapped air to escape during use (and to allow unpolymerized resin to drain during manufacture thereof by additive manufacturing).

Additional configurations (of both individual surface elements, and the manner in which they are arranged on the surface of an object) can readily be envisioned.

Applications.

The foregoing can be applied in a variety of ways to a variety of different objects, such as: (A) Skin and body contact applications-softer feel, perception of quality, better grip and friction, surface ventilation (sports equipment such as golf clubs, tennis racquets, ping pong paddles, and bicycle handlebar grips, helmet liners, etc.; consumer equipment such as headset earpieces; sunglass earpieces; watch band inner surfaces, shoe inserts (inner soles), etc.; medical devices such as hearing aid earpiece inserts, tool grips, etc. (B) Noise and/or vibration isolation (vibration absorbing surfaces), including automotive and aerospace applications (steering wheel covers and wraps (grip enhancement and vibration isolation); interior trim components (noise reduction), etc., and consumer and biomedical applications such as power tool grips (for vibration isolation), etc.

The present invention is explained in greater detail in the following non-limiting Example.

EXAMPLE

Figure 7A:
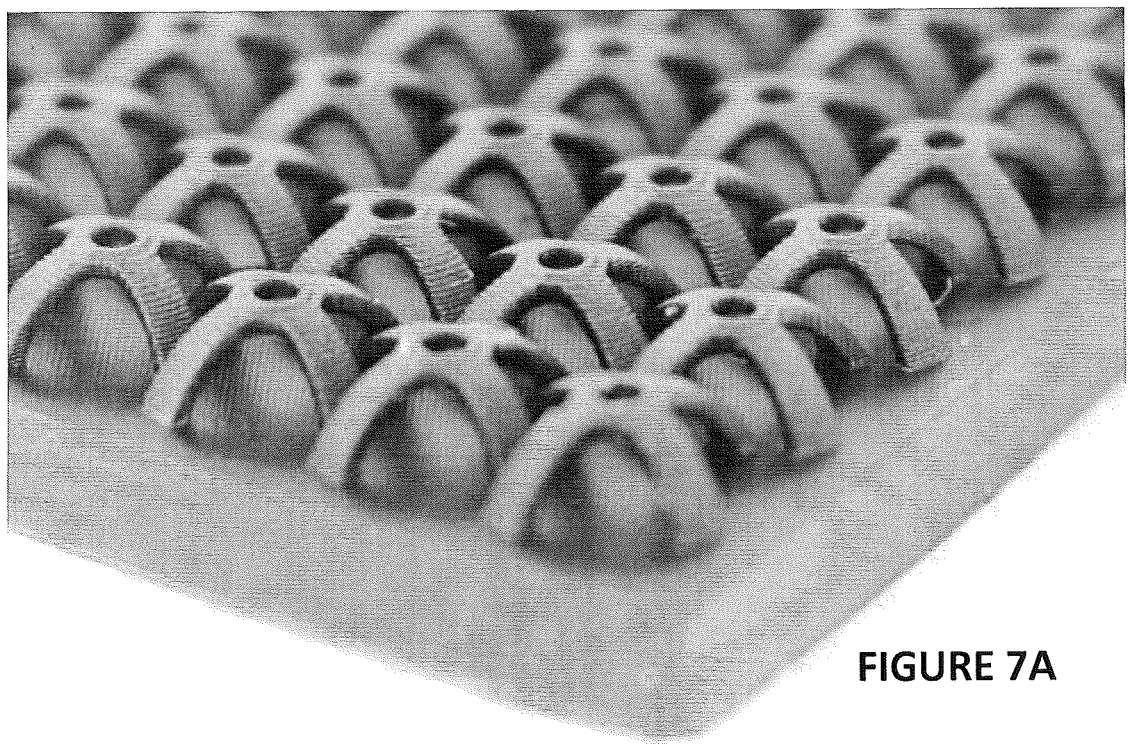
FIG. 7A is a detailed, perspective, photograph of an array of the present invention invention, produced by additive manufacturing with a flexible dual cure resin.
Figure 7B:
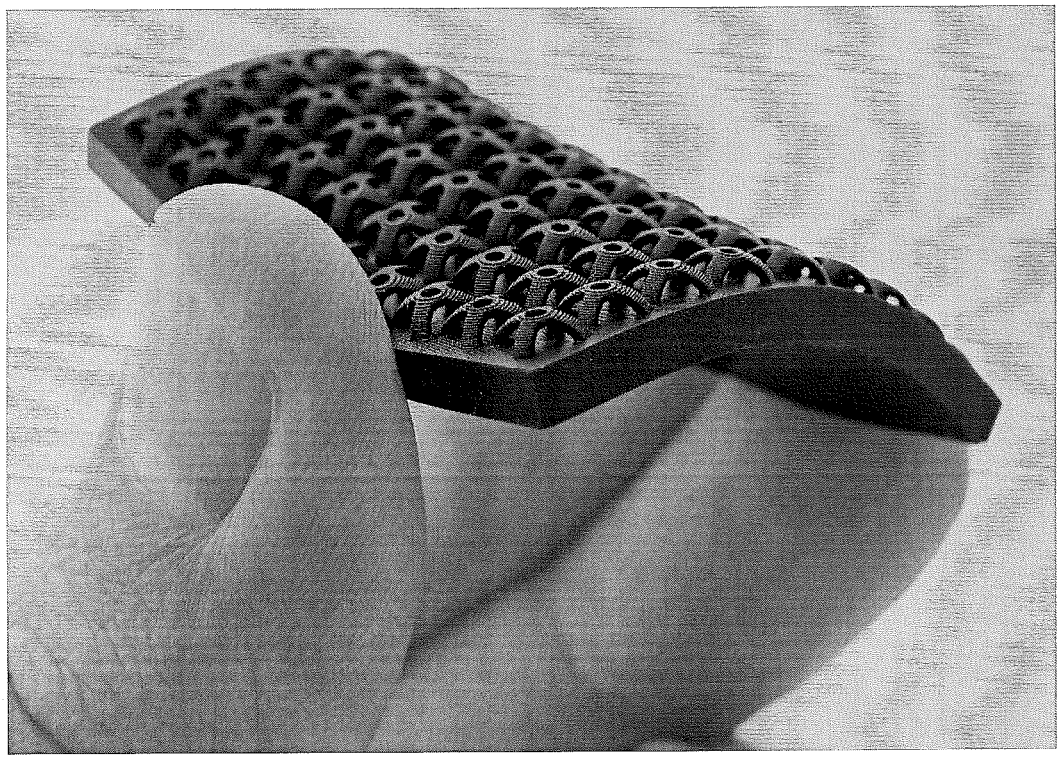
FIG. 7B is an enlarged, perspective, photograph of an array of FIG. 7A, showing the flexibility thereof.

An array of small three-dimensional structures (configured in substantially the same manner as shown in FIGS. 1A-1D above) is produced on the surface portion of a larger object during additive manufacturing on a Carbon Inc. M1 printer, using a Carbon, Inc. flexible polyurethane resin (both available from Carbon Inc., 1089 Mills Way, Redwood City, Calif. 94063). After additive production, the objects are washed and then baked to impart their final mechanical properties, in accordance with known techniques. Results are shown in FIGS. 7A-7B, with FIG. 7B emphasizing the flexibility thereof, and both Figures revealing the inner cavities of the features. The surface array can be easily applied to a variety of different substrates, including helmet liners, tool grips, handlebar covers, and others of those described above. Numerous additional configurations of the arrays (such as described above) can also be made on such objects, from the same or similar methods and materials.

The foregoing is illustrative of the present invention, and is not to be construed as limiting thereof. The invention is defined by the following claims, with equivalents of the claims to be included therein.

We claim:

1. A polymer object comprising:
   (a) a body portion having a surface portion thereon;
   (b) at least a first array of feature elements formed on said surface portion, each of said feature elements comprising:
      (i) a support structure connected to said surface portion and extending upward therefrom; and
      (ii) a top segment connected to said support structure, said top structure and said support structure together defining an internal cavity formed therein;
   (c) said polymer object produced as a single piece object by an additive manufacturing process, wherein at least one of said top segment and said support structure has at least one orifice formed therein.

2. The object of claim 1, wherein said feature elements are configured to deform or collapse by bending and/or buckling upon application of pressure thereto and return to their previous configuration upon removal of such pressure.

3. The object of claim 1, wherein said support structure comprises a circumferential wall or a plurality of arms.

4. The object of claim 1, wherein:
   (i) all of said feature elements in said array have a same external configuration, and optionally wherein at least some of said feature elements in said array have internal dimensions that differ from that of other feature elements in said array; or
   (ii) said array comprises a first set of feature elements and a second set of feature elements interspersed with one another, the feature elements of said first set having a height greater than the feature elements of said second set.

5. The object of claim 1, wherein at least some of said feature elements further comprise at least one support post positioned within said support structure, each said support post interconnecting said surface portion and said top segment.

6. The object of claim 1, wherein said top segment is flat, convexly curved, concavely curved, or a combination thereof.

7. The object of claim 1, wherein said array comprises a dispersed array, a nested array, or a combination thereof.

8. The object of claim 1, wherein said object surface portion on which said array is formed comprises a flat region, a concavely curved region, a convexly curved region, or a combination thereof.

9. The object of claim 1, wherein:
   each feature element has a height of from 1 millimeter to 20 millimeters;
   each feature element has a maximum width of from 1 millimeters to 40 millimeters; and/or
   said feature elements are included in said surface array at a density of from 1 per square centimeter to 300 per square centimeter.

10. The object of claim 1, wherein said additive manufacturing comprises stereolithography, including both top-down and bottom-up stereolithography comprising continuous liquid interface production or selective laser sintering.

11. The object of claim 1, wherein said resin comprises a dual cure resin.

12. The object of claim 1, wherein said object comprises a hand grip or hand grip wrap, and said surface portion comprises a gripping region of said grip or grip wrap.

13. The object of claim 1, wherein said top segment is convexly curved, concavely curved, or a combination thereof.

* * * * *